July 25, 1950 — D. SAMIRAN — 2,516,150
CONTINUOUS FLOW MULTIPLE TANK FUEL SYSTEM
Filed Aug. 1, 1945 — 8 Sheets-Sheet 2
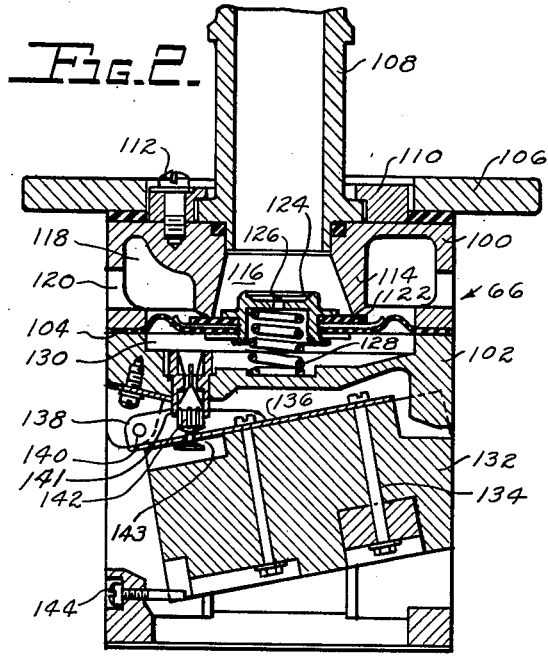
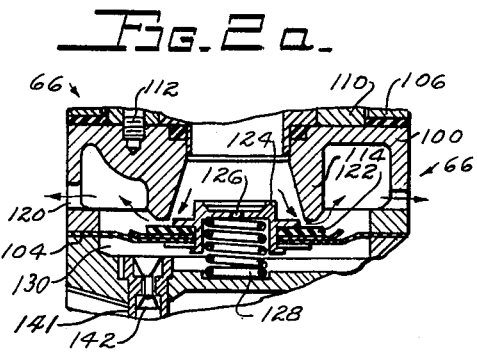
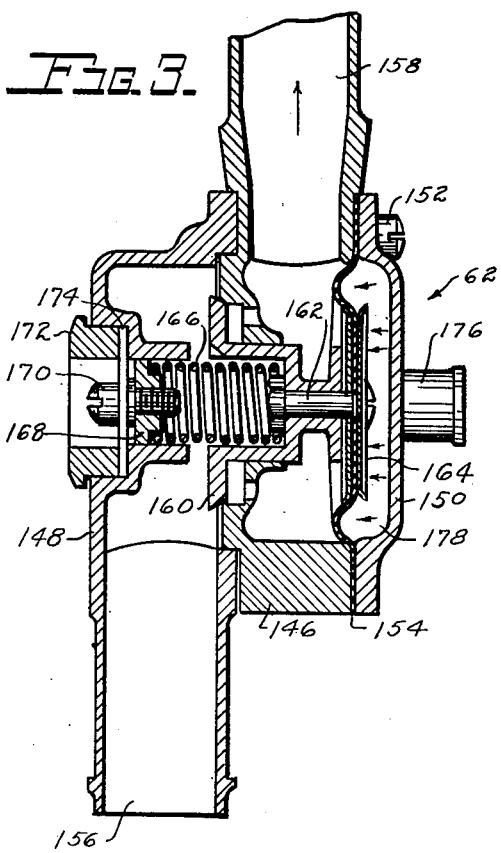
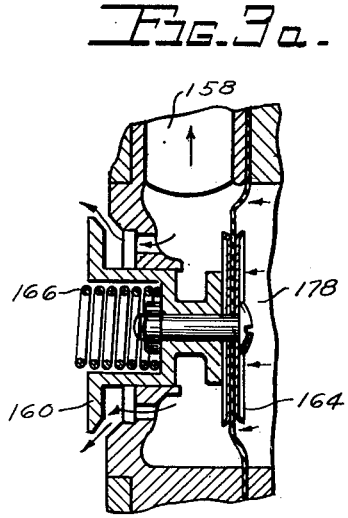
INVENTOR.
DAVID SAMIRAN
BY Clade Cooney AND
Frederick W. Cotterman
ATTORNEYS

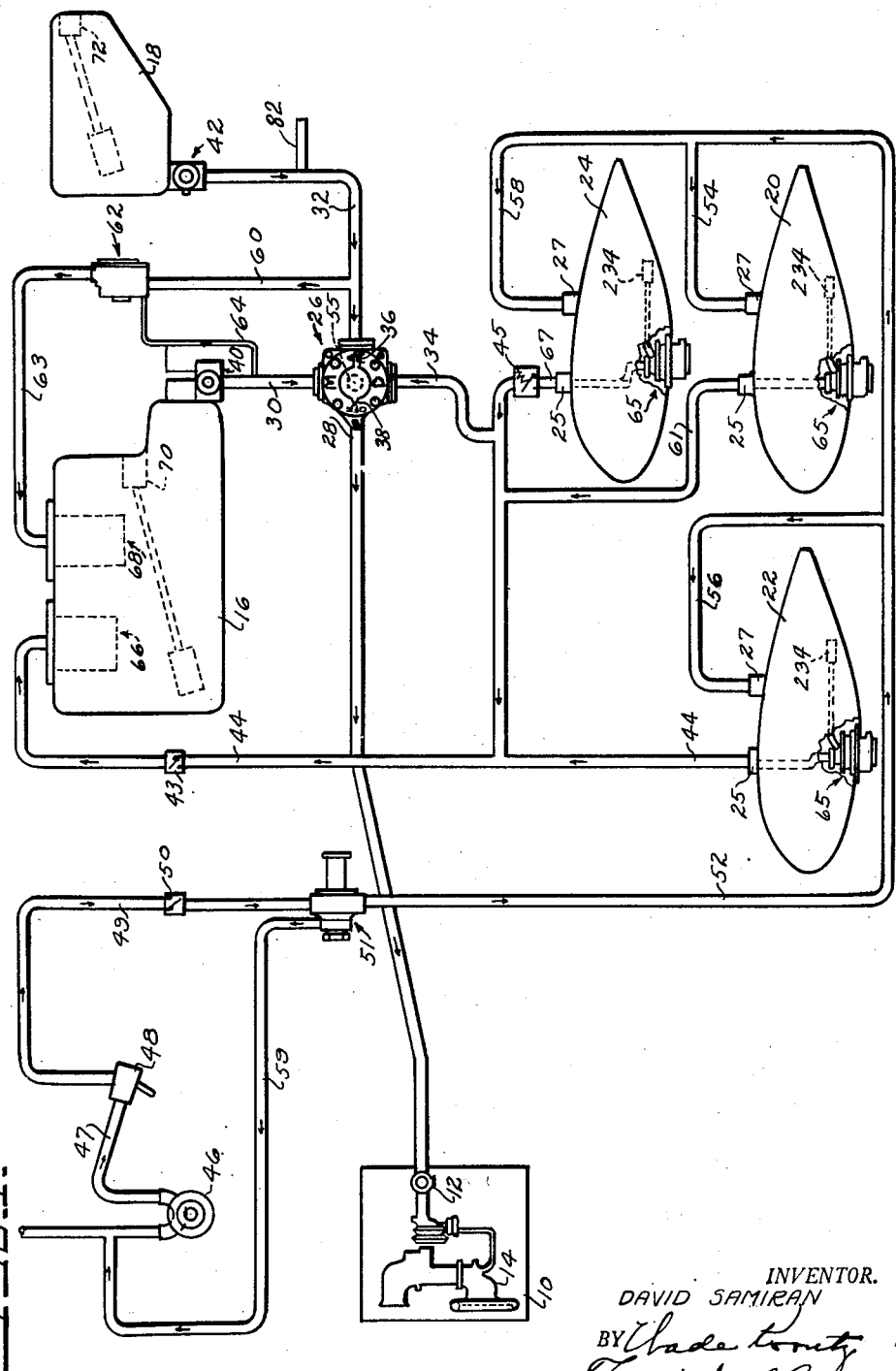

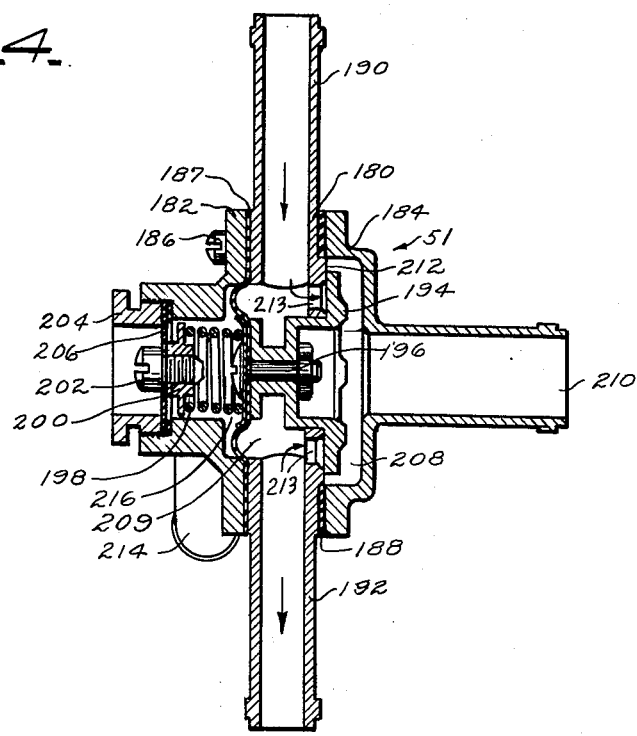
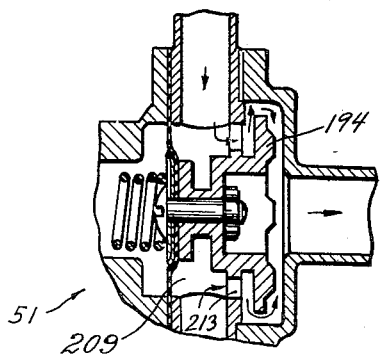

July 25, 1950          D. SAMIRAN          2,516,150
CONTINUOUS FLOW MULTIPLE TANK FUEL SYSTEM
Filed Aug. 1, 1945          8 Sheets-Sheet 4
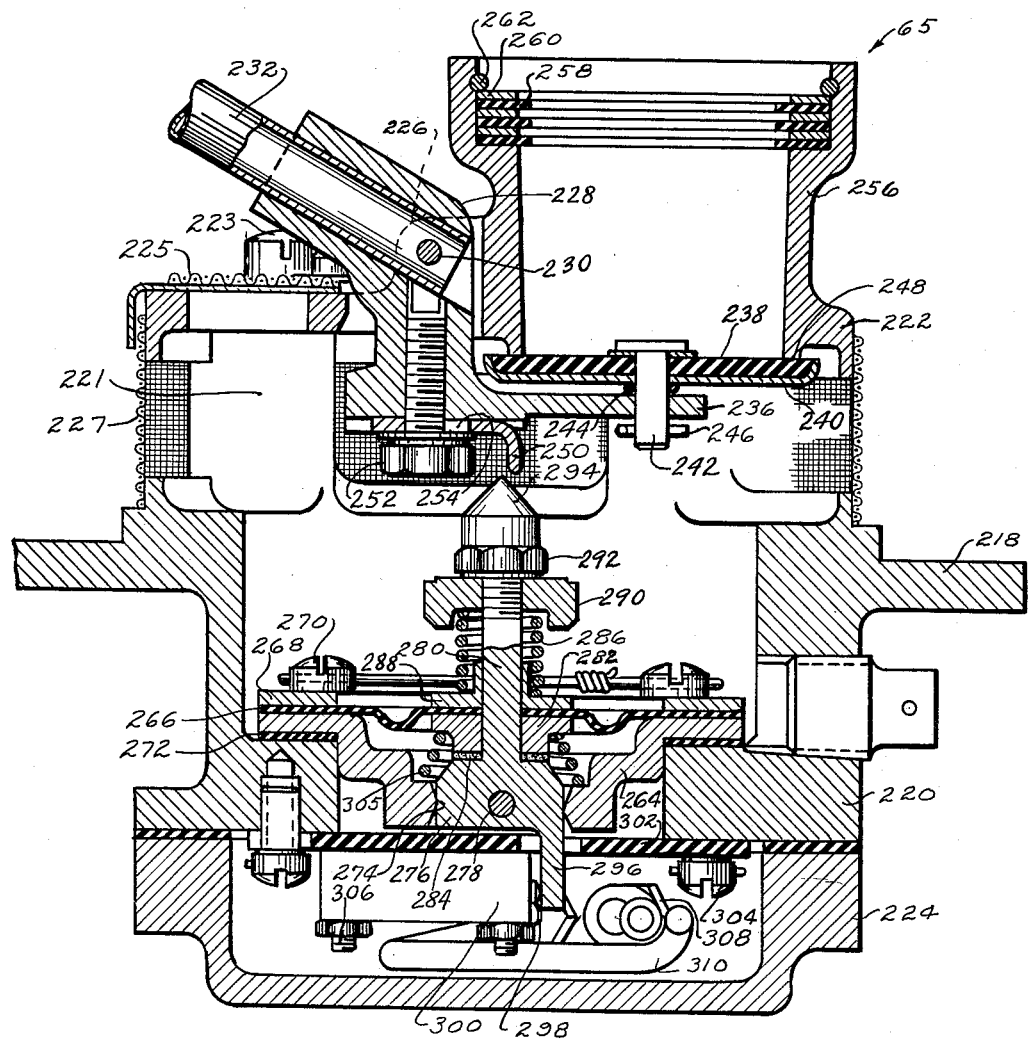
INVENTOR.
DAVID SAMIRAN
BY Wade Koonitz AND
Frederick W. Cotterman
ATTORNEYS

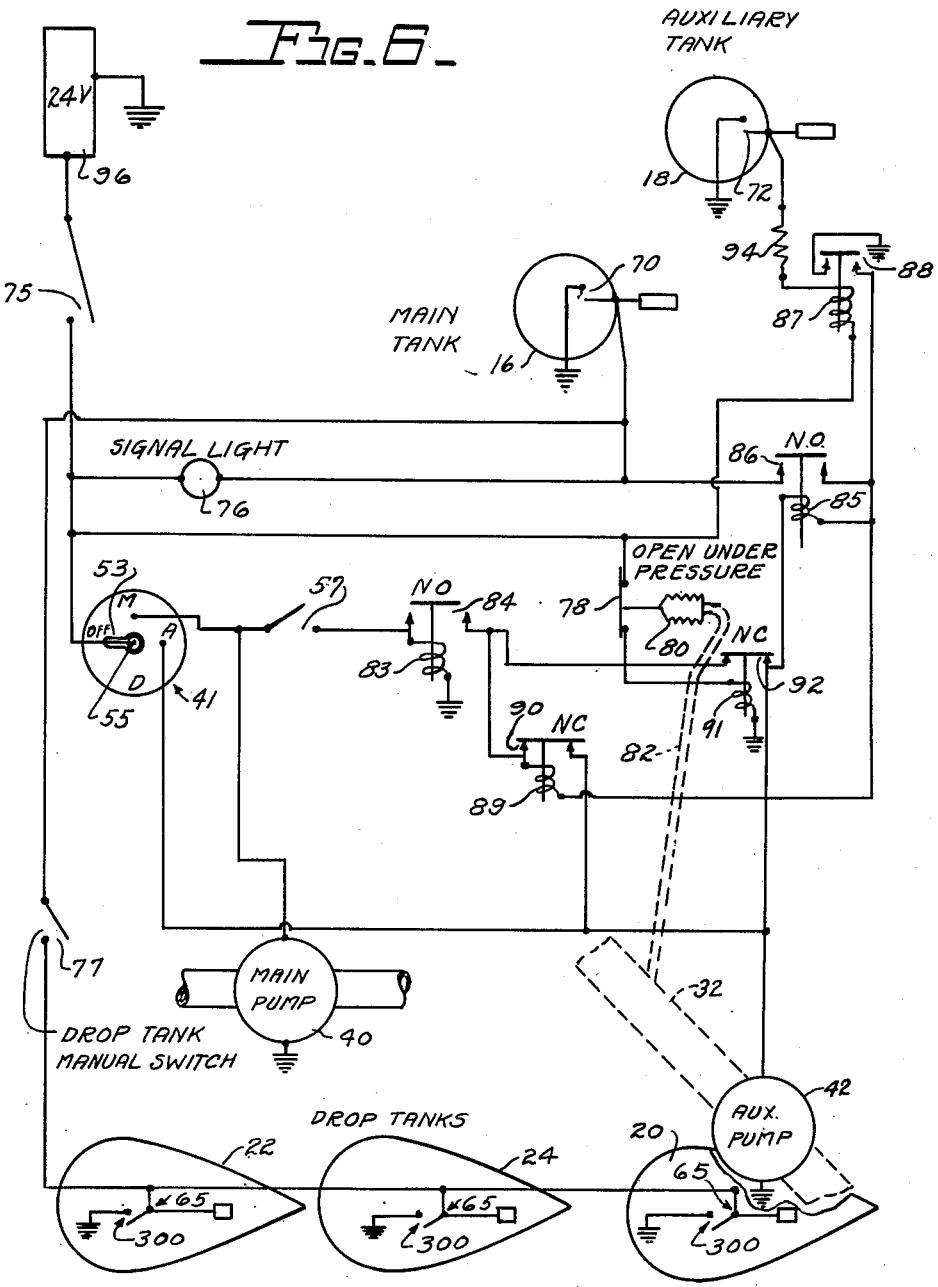

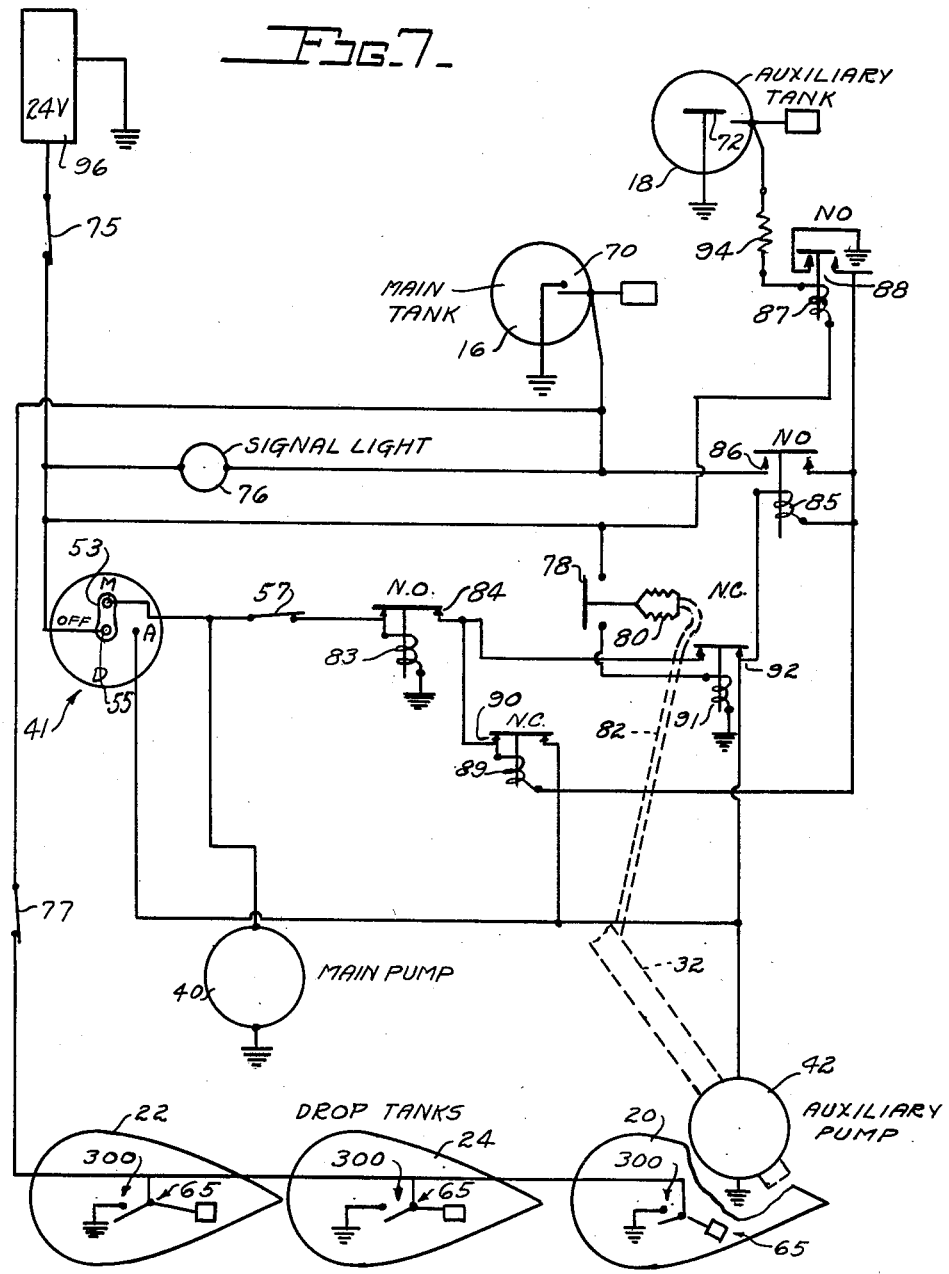

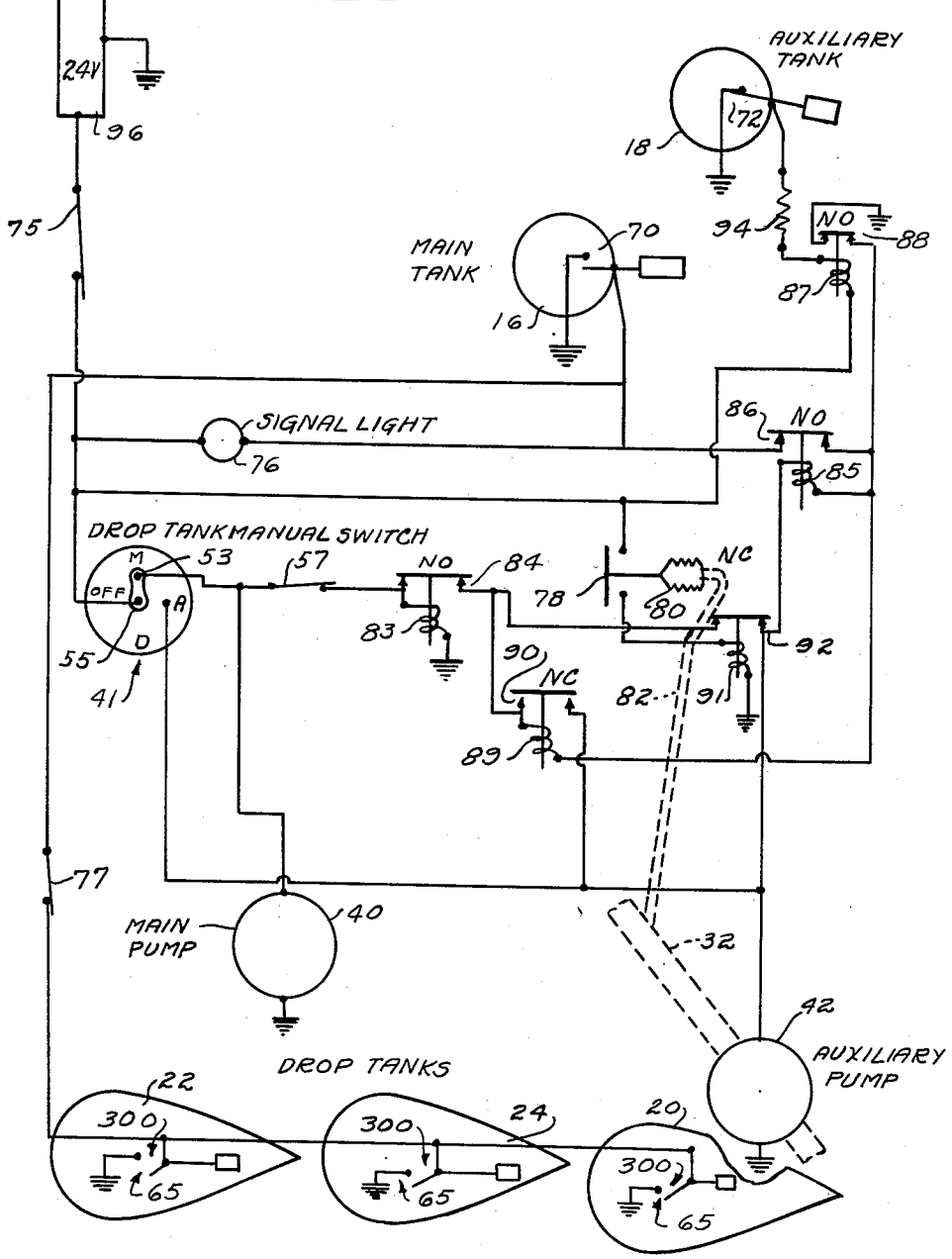

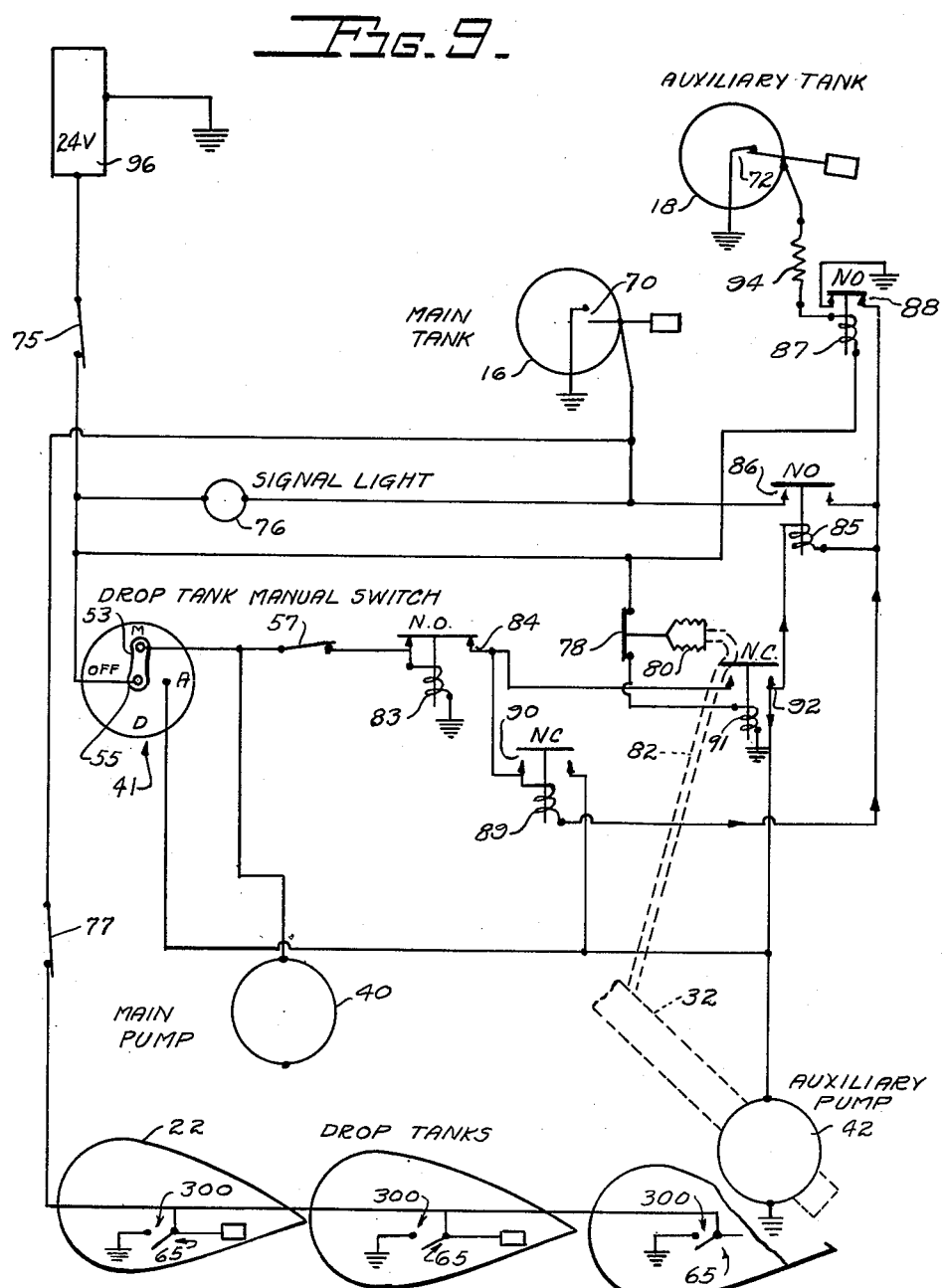

Patented July 25, 1950

2,516,150

UNITED STATES PATENT OFFICE 2,516,150

CONTINUOUS FLOW MULTIPLE TANK FUEL SYSTEM

David Samiran, Osborn, Ohio

Application August 1, 1945, Serial No. 608,348

7 Claims. (Cl. 158—36.3)

(Granted under the act of March 3, 1883, as amended April 30, 1928; 370 O. G. 757)

The invention described herein may be manufactured and used by or for the Government for governmental purposes without payment to me of any royalty thereon.

This invention relates to aircraft fuel systems having particular reference to multiple tank systems for aircraft.

In modern aircraft, particularly in warcraft, it is current practice to carry the fuel in a series of separate tanks distributed as uniformly as practicable throughout the available space in the craft, this practice being conducive to uniform weight distribution as well as having the advantage that if one tank is punctured and loses its fuel, the loss will be proportionally less as the number of tanks is greater.

In multiple tank fuel systems as heretofore constructed and arranged, a selector cock has usually been provided with a position for each tank whereby the pilot upon noting that one tank is empty switches the selector to another. This arrangement, however, has the disadvantage that an emergency pump is required which will pump fuel from some assured source while the changeover from one tank to another is being effected, together with a pressure drop sensitive instrument which will start and stop the emergency pump as the pressure situation requires.

One of the objects of the present invention is to provide a multiple tank fuel system in which, by a single setting of a selector cock, the entire contents of a series of fuel tanks will be delivered to the carburetor of an aircraft engine without the slightest interruption in the flow, but still retaining the ability, when conditions warrant, to manually select the tanks one after the other in any order which the circumstances may indicate as desirable.

In long range missions, particularly in long range bombing missions, where maneuverability is not a requirement during flight to the objective but usually becomes highly important upon arrival at the objective, it is current practice to provide a series of externally borne drop tanks, the fuel in which preferably is used first in getting to the objective, whereupon the drop tanks are discarded.

It is therefore another object of this invention to provide a series of drop tanks which may preferably include a right-wing tank, a left-wing tank, and a belly tank, with means whereby the wing tanks will be emptied uniformly, part out of each tank, so as to maintain a balanced condition, the wing tanks being completely emptied before any fuel is withdrawn from the belly tank.

Another object is to provide suitable signal means to indicate to a pilot when fuel in a tank is getting low, together with means to shut off the signal together with the pump when the said tank is completely empty.

Other objects, advantages, and meritorious features will become apparent as the invention is further described with reference to the drawings, wherein:

Fig. 1 is a schematic layout of the improved fuel system which is the subject of this invention.

Fig. 2 is an axial section through one of the float-operated valves shown in the closed position and used to prevent more fuel entering a tank after it is filled to a predetermined level.

Fig. 2a is a fragmentary section showing the valve of Fig. 2 open.

Fig. 3 is a longitudinal vertical section through a pressure-operated fuel flow control valve for controlling the flow of fuel moving from the auxiliary to the main tank, the valve being shown closed.

Fig. 3a is a fragmentary section through the valve of Fig. 3 but in the open position.

Fig. 4 is a vertical section through the air pressure control valve when closed.

Fig. 4a is a fragmentary section through the valve of Fig. 4 in the open position.

Fig. 5 is a longitudinal vertical section through one of the float-operated valves used in the drop tanks to maintain their fuel in a level condition.

Fig. 6 is a wiring diagram showing the condition of the switches and relays when the selector handle is at "Off," and the fuel bypass and drop tank manual switches are open, as when the craft is grounded and the system is not in operation.

Fig. 7 is a wiring diagram showing the arrangement of the switches and relays when the selector handle is put on "Main," and the fuel bypass and drop tank manual switches are closed, as when the system is arranged for the preferred method of operation, that is, first pumping the fuel from the drop tanks through the main tank, then pumping the fuel from the auxiliary tank through the main tank, then pumping the fuel from the main tank.

Fig. 8 is a wiring diagram showing the condition of the switches and relays of the system after the drop tanks have been emptied and the fuel level in the auxiliary tank is at a predetermined low level where a warning signal light is lit.

Fig. 9 is a wiring diagram showing the condition of the switches and relays of the system when the auxiliary tank is completely empty and the signal light is extinguished and the auxiliary pump stopped.

Like reference characters refer to like parts throughout the several views.

Referring now to the drawings, an aircraft engine 10 carries the usual engine pump 12 which is operatively connected to the engine to be driven thereby and adapted to supply fuel under pressure to the carburetor 14 or to a like fuel metering device. A main tank 16 and an auxiliary tank 18 are carried within the aircraft as a permanent part thereof, while a right wing tank 20, a left wing tank 22 and a belly tank 24 are carried externally with releasable connections, 25 and 27, for discarding them when they have served their purpose. A selector cock 26 has its common outlet connected by a pipe 28 to the suction side of the engine pump 12.

Pipes 30, 32 and 34 carry the fuel from the main, auxiliary, and drop tanks, respectively, to the several inflow openings of the selector. The handle 36 of the selector has a pointer 38 for indicating when the selector is set at a desired position. Indicia "M," "A" and "D" on the face of the selector facilitate the setting for taking fuel from the main, auxiliary, and drop tanks, respectively. The pointer may be moved to fourth or "Off" position which indicates that all inlets to the selector are closed.

An electrically driven main pump 40 is provided for taking fuel from the main tank 16, the fuel being delivered through the pipe 30 to the position "M" on the selector 26, and, when the selector pointer is at "M," through the pipe 28 to the carburetor 14. An electrically driven auxiliary pump 42 delivers fuel from the auxiliary tank 18 through the pipe 32 to the position "A" on the selector, and, when the selector pointer is at "A," through the pipe 28 to the carburetor 14. A selector switch 41 (see Fig. 6) has a current carrying arm 53 which is fast on the same shaft 55 as the pointer 38 and handle 36, the arm 53 being so positioned on the shaft 55 with respect to the pointer 38, that when the pointer is at "M" on the selector cock the arm will be in contact with "M" on the selector switch, and, when the pointer is at "A" on the selector cock, the arm will be in contact with "A" on the selector switch.

Suitable connections hereinafter described are made from the switch positions "M" and "A" to the electric motors of the main and auxiliary pumps respectively.

A manual switch 57 is provided and so connected in the system that when the arm 53 is on "Main," and, the manual switch 57 is closed, both the main pump 40 and the auxiliary pump 42 will go into operation. The electrical wiring for the system will be hereinafter described.

In order to cause the drop tanks 20, 22, and 24 to discharge fuel through the pipe 34 to position "D" on the selector, these tanks are pressurized, the pressure employed being sufficiently high to raise the fuel by way of a branch pipe 44 to the top of, and into the main tank 16, when so desired. A check valve 43 is provided to prevent return flow in pipe 44. A check valve 45 is spring loaded whereby, with a uniform pressure in the branches 54, 56 and 58, the fuel in the wing tanks 20 and 22 will be transferred to the main tank 16 ahead of the fuel in the belly tank 24. A combined float operated valve-and-switch mechanism 65 is placed in the bottom of each of the drop tanks 20, 22 and 24, the valves being provided to insure that the fuel will move out of each tank through the fuel pipes 44 and 61 uniformly, thereby to maintain a balanced condition, and the switches being provided to light a signal light when the drop tanks are nearly empty. A manual switch 77 is provided and used when it is desired to make the switches of the float mechanism ineffective. The combined float operated valve and switch mechanism identified by the numeral 65 in Fig. 1 is shown to a larger scale and in greater detail in Fig. 5 and will be hereinafter more fully described with reference thereto.

As a means for providing the necessary pressure for the drop tanks, the vacuum pump 46 is used. This pump is already part of the standard equipment on aircraft where vacuum operated instruments are employed. The discharge or pressure side of the vacuum pump 46 is connected through pipe 47, air-oil separator 48, pipe 49, check valve 50, and an air pressure control valve 51, to the air pressure line 52 from which branches 54, 56, and 58 extend to the tops of the drop tanks 20, 22 and 24 respectively. The check valve 50 is biased to prevent return flow to the pump 46. An air pressure control pipe 59 connects the vacuum side of the pump 46 to the air pressure control valve 51. The air pressure control valve, identified in Fig. 1 by the numeral 51, is shown in greater detail and to a larger scale in Figs. 4 and 4a, and is hereinafter described with reference thereto.

A branch pipe 60 connects the pipe 32 through a pressure openable valve 62 and pipe 63 to the top of the main tank 16. A small pressure transmitting pipe 64 connects the valve 62 to the pipe 30, whereby the auxiliary pump 42 may take fuel from the auxiliary tank 18 and transfer it through the branch pipe 60 to and into the top of the main tank 16, but only when main pump 40 is in operation and the pressure in the pipe 30 and small pipe 64 is up. The pressure openable valve identified in Fig. 1 by the numeral 62 is shown in greater detail in Figs. 3 and 3a and is hereinafter described with reference thereto.

The drop tank fuel transfer pipe 44 and the auxiliary tank fuel transfer pipe 60 discharge into the top of the main tank 18 through float valves 66 and 68 respectively, these float valves being designed to prevent any more fuel from entering tank 16 after a predetermined level is reached. Float valve 66 differs from float valve 68 only in that the fuel level in tank 16 need not drop as low to open the valve 66 as it does to open the valve 68, whereby valve 66 is always open to receive fuel from the drop tanks before valve 68 will open to receive any fuel from the auxiliary tank. The float valve identified in Fig. 1 by the numeral 66 is shown to a larger scale and in greater detail in Figs. 2 and 2a and will be hereinafter described with reference thereto.

Float operated electric switches 70 and 72 within the main and auxiliary tanks 16 and 18 respectively are provided for lighting a signal light 76 when the fuel reaches a certain low level which is predetermined for each tank. Switches 70 and 72 are conventional float operated switches well known in the art. A switch 78 is operated by a bellows 80 which is connected to the discharge side of the auxiliary pump 42 by pipes 82 and 32. Switch 78 therefore is closed whenever the auxiliary pump 42 is not maintaining the pressure in pipe 32. Relays 84, 86 and 88 are normally open, that is, open when no current is applied to their coils. Relays 90 and 92 are normally closed, that is, closed when no current is applied to their coils.

A resistor 94 is in circuit with the switch 72 for holding the operating voltage to a minimum. A battery 96 or like device supplies the current for operating the system, and is connected thereto by a main switch 75.

The float valve, identified in Fig. 1 by the numeral 66, and shown in detail in Figs. 2 and 2a, comprises a housing in two parts, 100 and 102, with a diaphragm 104 clamped therebetween. The upper part 100 has a flange 106 secured thereto to facilitate connection to the upper side of the tank 16. A hose connection 108 is secured to the upper part 100 by a clamp ring 110 which is secured to the upper housing part 100 by screws 112.

The upper housing part 100 has a central hub 114 with an opening 116 which is in alignment with the opening in the hose connection 108 and connected pressure tight thereto. An annular space 118 surrounds the hub 114 and has a series of radial openings 120 connecting the annular space to the outside of the housing. A valve washer 122 carried on the upper side of the diaphragm 104 is secured thereto by a cup-shaped member 124 having a small central leakage opening 126. A spring 128 has its lower end seated in a shallow cup in the bottom wall of the lower housing part 102 and its upper end seated in the cup-shaped member 124, whereby the valve washer 122 is maintained on the seat formed by the end of the hub 114.

A chamber 130 formed immediately under the diaphragm 104 is adapted to receive fluid under pressure through the small leakage opening 126 whereby the valve washer 122 is maintained on its seat. A float 132 of cork or similar material has attached to the upper side thereof by bolts 134 a sheet metal member 136 which carries a pair of hinge ears 138 whereby the float may have hinged connection with the housing portion 102 by means of the hinge pin 140.

A small renewable valve seat member 141 is press fitted into an opening in the bottom wall of the lower housing part 102, and a small longitudinally grooved valve member 142 is upwardly slidable in the seat member onto its seat to close the small valve. The small valve member 142 is annularly grooved near its lower end as at 143, the neck formed by the annular groove being loosely contained in a slot (not shown) in the sheet metal member 136, whereby the small valve 141, 142, is closed when the float rises and opened when the float drops, so that pressure will be built up in the chamber 130 by reason of fuel under pressure entering through the opening 126. This fluid is retained in the chamber 130 as long as the small valve 141, 142 is closed whereby the p. s. i. in the chamber 130 below the diaphragm 104 will be the same as the p. s. i. in the opening 116 above the main valve washer 122. However, since the area of the diaphragm 104 which is exposed to the p. s. i. pressure in the chamber 130, greatly exceeds the area of the main valve washer 122 which is exposed to an equal p. s. i. pressure in the opening 116, the main valve washer 122 will be securely held on its seat as long as the small valve 141, 142 remains closed. When thereafter, by reason of fuel being withdrawn from the bottom of the tank 16, the float 132 drops to a lower position, the small valve 141, 142 will thereby be opened, and, since the small valve 141, 142 is of greater flow capacity than the leakage opening 126, the chamber 130 will be depressurized. Fluid may now flow in through the connection 108 and force the main valve washer 122 off its seat, thus allowing incoming fuel to flow between the main valve washer 122 and its seat, radially outward through the annular space 118 and radial openings 120 into the tank 16 until the float is again raised, the small valve 141, 142, again closed, pressure again built up in the chamber 130 and the main valve washer 122 again seated. An adjustable screw stop 144 limits downward travel of the float. Valve 66, herein shown in Fig. 2, is shown, described, and claimed in my copending application, Serial No. 645,694, filed February 5, 1946, now Patent Number 2,491,521, issued Sept. 23, 1949.

The pressure-openable valve, identified in Fig. 1 by the numeral 62, and shown in detail in Figs. 3 and 3a, comprises a body 146 having a rear head 148 and a front cover 150 secured to the body by screws 152, with a diaphragm 154 clamped pressure tight between the body 146 and the cover 150. Hose connections 156 and 158 communicate with the interior of the rear head 148 and body 146, respectively, connections 156 and 158 being adapted for connection to pipes 60 and 63 respectively. A valve head 160 is attached to the diaphragm 154 by a bolt 162, washers 164 being applied to both sides of the diaphragm to stiffen its central portion.

A spring 166 has one end reacting against an internally threaded collar 168 and the other end bearing on the valve head 160, whereby the valve is kept in closed position. A screw 170 is provided for adjustment of the spring 166. An externally threaded cap 172 is provided for holding a washer 174, against which the screw 170 bears, in place. A hose connection 176 extends into the chamber 178 which is formed in the cap 150 above the diaphragm. Connection 176 is adapted to be connected to the small pipe 64 shown in Fig. 1. Pressure introduced into the chamber 178 through the connection 176 will move the valve to open position as shown in Fig. 3a.

Air pressure control valve, Figs. 4 and 4a, identified in Fig. 1 by the numeral 51, shown in section and to a larger scale, comprises a valve body 180 with a rear head 182 and a front head 184 secured thereto by screws 186, a diaphragm 187 and a gasket 188 being clamped under the rear head 182 and front head 184, respectively, by screws 186 thereby making a pressure tight joint between the body and the two heads and dividing the interior of the valve body into three compartments 208, 209, and 216. Hose connections 190 and 192 are provided for connecting to the pipes 49 and 52, respectively. A valve head 194 is secured by a small bolt 196 to the diaphragm 187. A spring 198 has the front end acting against the diaphragm 187, the rear end reacting against an internally threaded part 200 which is adjustable axially by a screw 202. A cap 204 clamps a washer 206 in position, washer 206 being provided as a bearing for the adjusting screw 202. The chamber 208 above the valve head 194 is connected by a passageway 210 to the atmosphere. The chamber 209 is connected to the pressure side of the pump 46 and to the tops of the drop tanks 20, 22 and 24. The valve seat 212 in the body 180 has a series of openings 213 which are uncovered when the valve head 194 rises from its seat as in Fig. 4a. A pipe connection 214 adapted for connection to the pipe 59, Fig. 1, connects the vacuum side of the pump 46 to the chamber 216 for influencing the action of the diaphragm 187. When the valve 194 is closed, as it necessarily is during normal operation, the leftward force in the chamber 209 greatly exceeds the rightward force in that chamber, because, in chamber 209, there is a greater left wall area than right wall area exposed to the same p. s. i. pressure. Moreover, the leftward force contributed by the vacuum in chamber 216 must be added to the leftward force accruing from chamber 209. The spring 198 is then proportioned and adjusted so that it exerts a rightward force somewhat less than that necessary to open the valve 194 as long as the pressure in chamber 209 is normal, but, should a leak occur in pipe connection 190 or 192, so that the pressure in chamber 209 would drop below the required value, the spring 198 would open the valve 194 thereby instantly connecting the tops of all drop tanks to the atmosphere through the connection 210, a condition necessary if the fuel is to be pumped out of the drop tanks instead of being forced out by pressure. An advantage of this construction is that if the vacuum pump 46 should cease to function, the valve 51 will open and the space in the drop tanks above the fuel level will be connected to the atmosphere by way of the opening 210 and the selector cock may then be set to allow the engine pump 12 to draw the fuel directly from the drop tanks.

The float-controlled valve and switch mechanisms, identified in Fig. 1 by the numeral 65 and shown in section and to a larger scale in Fig. 5, are provided with flanges 218 by which they are joined to openings in the bottoms of the drop tanks 20, 22 and 24 by bolts not shown. Each valve and switch mechanism has a body 220 having a valve housing 222 secured to upwardly extending posts 221 on its upper side by screws 223, screen covers 225 and 227 being provided through which fuel from the drop tanks must flow to pass through the valve and a switch housing 224 secured to its lower side by screws which do not appear in the view shown.

The midportion of the body 220 contains the mechanism which provides the necessary interaction between the valve and the switch. The valve housing 222 has a pair of spaced apart ears 226 between which a float-operated lever 228 is hinged by the pin 230. A tubular arm 232 has one end anchored in the lever 228 while its outer end carries a float 234. The lower end of the lever 228 is extended laterally at 236 to provide means for operating the valve to opened or closed position as the float rises or falls. A resilient valve disc 238 lies in a saucer-like part 240 and is held in the desired position by a pin 242 which passes through openings in the disc and through an opening in the lever extension 236 near its outer end.

A wire washer 244 between the part 240 and 236 and a cotterpin 246 positioned slightly away from the bottom of the extension 236 permits limited rocking movement of the valve disc 238 whereby it may effectively engage the seat 248 in the valve housing 222 when the float is in its lower position. A switch-operating trigger 250 is secured to the lever 228 by a screw 252, the trigger having an elongated slot 254 whereby it may be adjusted horizontally.

A neck 256 is made integral with the valve housing 222 for receiving the lower ends of the pipes 44, 61 and 67, Fig. 1, these lower ends being fixed in and made a part of the drop tanks. Washers 258 of soft synthetic rubber or similar material alternating with washers 260 of harder material are held in the neck 256 by a snap ring 262. An entire unit 65 may thus be assembled into a drop tank by merely pushing it up from the bottom so that a pipe enters a neck 256, then bolting the flange 218 to the tank.

The switch-operating mechanism, whereby an electric light is lit when the drop tank is nearly empty and extinguished when it is quite empty comprises a flanged hub member 264 with a diaphragm 266 and a diaphragm clamp ring 268 all clamped together and fastened to the body 220 by the screws 270, a gasket 272 being provided between the member 264 and the body 220 to seal against leakage from the valve compartment into the switch compartment.

A central opening in the member 264 is tapered in both directions from the middle as at 274 to freely receive the rockable switch actuating lever 276 which is hinged in the opening by the pin 278. The switch-actuating lever 276 includes a stem 280 which extends upwardly from the body of the lever leaving a shoulder upon which the collar 282 rests, a gasket 284 being placed under the collar to prevent leakage. A spring 286 forces a collar 288, the diaphragm 266, the collar 282 and the gasket 284 together and against the shoulder on the body of the lever 276 whereby leakage along the stem 280 is prevented. The reaction of the upper end of the spring 286 is taken by the nut 290 which is adjustable on the upper threaded end of the stem 280. A jam nut 292 locks the nut 290 in the adjusted position, the upper end 294 of the jam nut 292 is of conical form and engages the depending end of the trigger 250. A switch operating arm 296 depends from the body of the lever 276 and is adapted to engage the operating stem 298 of a switch 300.

Switch 300 is of conventional form being of the type which makes electrical contact when the stem 298 is pushed in, and breaks contact when the stem is released. The switch is mounted on an insulating plate 302 which is adjustable horizontally by loosening the screws 304 so that the arm 296 substantially touches the stem 298 when in the closed valve position shown.

A frustoconical spring 305 rests upon a shoulder in the member 264, its upper end bearing against the collar 282 to maintain the actuating lever 276 in the neutral position shown. Binding posts 306 on the switch are connected to binding posts 308 on the lower housing 224 by flexible leads 310.

The wiring diagram, Fig. 6, shows the condition of the switches and relays as they appear when the system is idle, the selector switch 41 being at the "Off" position, the main switch 75 and the manual switches 57 and 77 being open. Relays 84, 86, and 88, having actuating coils 83, 85 and 87 respectively, are open as shown when no current flows through their coils while relays 90 and 92, which have actuating coils 89 and 91 respectively, are closed as shown when no current flows through their coils. The float switches 70, 72 and 65 are open, the tanks 16, 18, 20, 22 and 24 being full. The electrically driven pumps 40 and 42, being without current, are not operating, whereby the pressure - controlled switch 78, being without pressure in its bellows 80, is closed.

Let it now be assumed that it is desired to condition the system for its preferred method of operation. If the main switch 75, Fig. 6, is now closed, current will flow through the closed switch 78 to the coil 91 whereby the normally closed switch 92 will open momentarily. The selector handle 36 is then turned until the selector cock pointer 38, Fig. 1, and the selector switch arm 53, Fig. 7, are both on "M" (see Fig. 7), whereby current flows to the main pump 40 and starts it into operation, pumping fuel from the main tank 16 through pipe 30, selector cock 26 and pipe 28 to the suction side of the engine pump 12 at the same time opening the pressure openable switch 62 (see Fig. 1) by reason of the fluid pressure passing through the small pipe 64.

Switch 57 should now be closed as shown in Fig. 7, whereupon relay coil 83 will be energized, whereby the normally open relay 84 will be closed. Coil 89 is not being energized at this time, so the normally closed relay 90 remains closed, thereby maintaining the circuit to the motor of the auxiliary pump 42.

Operation of the auxiliary pump 42 pressurizes the bellows 80 and thereby opens the switch 78, whereupon the relay coil 91 is deenergized and the relay 92 which was momentarily opened is now closed. It is noted that conditioning the system for its preferred mode of operation involved merely closing the main switch 75, turning the selector to "M" and closing the switch 57. With the system arranged as seen in Fig. 7, the fuel in the entire system may be used without further attention by the pilot. Its operation is as follows:

As fuel is taken from the main tank by the main pump 40, it may be replaced by fuel from the pressurized drop tanks 20, 22 or 24 or from the auxiliary tank 18, but since the float valve 66 (see Fig. 1) is set to open at a higher level than the float valve 68, the fuel is all taken from the drop tanks before any is taken from the auxiliary tank. Moreover, it is the function of the spring loaded check valve 45 to retain the fuel in the belly tank 24 until after the wing tanks are emptied, and it is the function of the float valves 65 in the two wing tanks to restrict the fuel outlet most in the tank in which the fuel is lowest, thereby to cause the two wing tanks to maintain a balanced relation.

When the two wing tanks are nearly empty, the switch operating triggers 250 of the float valve-and-switch mechanism 65, Fig. 5, contact the cone 294 on the left side and lean the switch actuating lever 276 progressively more to the right as the tank becomes more nearly empty, thus closing the switch 300 of the float mechanism 65 while there is still a small quantity of fuel in the tank and thereby lighting the signal light 76, Fig. 7, indicating to the pilot that the fuel in the wing tanks is almost depleted. The trigger 250 and the cone 294 are so adjusted, with respect to the float 234, that just as the tank becomes quite empty, the trigger 250 passes over center on the cone 294 to the right side of center (see Fig. 5) and the switch 300 is thereby opened and the signal 76 thereby extinguished, just as the valve disc 238 is pressed onto the seat to its closed position. At the option of the pilot the two wing tanks 20 and 22 may now be dropped by undoing the connections 25, 27. The mechanism by which the pilot may loosen these connections to drop these tanks forms no part of this invention and is therefore not herein shown.

After the wing tanks are thus emptied and dropped, fuel flows from the belly tank 24 until its float operated valve-switch mechanism 65 lights the warning signal 76 to indicate that the tank is nearly empty, then shuts off the signal and closes the valve when the tank is quite empty. The belly tank 24 may now also be dropped, but for purposes of later description the drop tanks are retained in subsequent diagrams.

Now since there is no more fuel to come from the drop tanks into the main tank 16 through the float valve 66, a small amount of fuel will next be withdrawn from the main tank to lower the level to a point where the float valve 68 will open to receive fuel from the auxiliary tank 18.

Since the main pump 40 is now operating, the pressure in pipe 30 will be up, and the pressure openable valve 62 consequently will be open. The auxiliary pump 42 will therefore pump out the auxiliary tank 18 through pipes 32, 60 and 63 into the main tank 16 as fast as it is used out and is let in by the float valve 68. When the auxiliary tank 18 is nearly empty, the float switch 72 closes (see Fig. 8), whereby the coil 87 of the normally open relay 88 is energized, and the relay 88 closes, thereby completing a ground connection which energizes coils 85 and 89, thereby closing the normally open relay 86 and opening the normally closed relay 90.

A circuit is now completed through the signal light 76 which indicates to the pilot that the fuel is getting low. The motor of the auxiliary pump 42, however, continues to operate for the time being to pump out the remaining fuel. But when the auxiliary tank 18 is quite empty, the pump 42 takes in air which causes the pressure in the bellows 80 to drop and close the switch 78 as in Fig. 9 whereby the coil 91 is energized and the normally closed switch 92 opens, thus breaking the circuit through the motor of the pump 42, and thereby stopping the pump, and breaking the circuit through the coil 85 of the relay 86, and thereby extinguishing the signal light 76, all as seen in Fig. 9.

All tanks except the main tank now being empty, fuel is taken from the main tank by the pump 40 and when a predetermined low level is reached the float switch 70 closes and lights the warning light 76 which remains lit until the pilot alights and opens the main switch 75.

The foregoing is the preferred procedure whereby all of the fuel may be used with least manipulation by the pilot. It may happen, however, that the pilot desires to first pump the fuel from the drop tanks then switch to the main tank, as where the auxiliary tank has been punctured and the fuel lost, or where, for some reason, he desires to hold the fuel in the auxiliary tank in reserve. To do this he may close the manual switches 75 and 77 but leave the manual switch 57 open, whereby the auxiliary pump 42 will be rendered inoperative, and the shift will be directly from the drop tanks to the main tank. The warning light 76 will then become operative, as before, when the fuel reaches a predetermined level in the main tank.

It may also happen that the pilot desires to pump the fuel from the auxiliary tank directly to the intake side of the engine pump. This may be accomplished by setting the selector pointer 38 on "A," whereby the selector switch 41 starts the auxiliary pump 42, and shuts off the main pump 40. Shutting off the main pump 40 reduces the pressure in pipes 30 and 64 whereby the pressure openable valve 62 closes, thereby preventing fuel flow through pipe 60 and valve 62 to the main tank 16. All switches and relays return to the position shown in Fig. 6 and operate as before explained to light the signal 76 when the auxiliary tank is nearly empty.

If for any reason it is desired to pump the fuel from the drop tanks directly to the engine pump before pumping it from the main and auxiliary tanks, this may be done by placing the selector pointer 38 to "D," in which case the selector switch 41 shuts off both the main pump 40 and the auxiliary pump 42. The pipes 44, 61, and 67 of the pressurized drop tanks now all discharge through the pipe 34, selector cock 26, pipe 28 to the suction side of the engine pump 12. No fuel may now pass through the pipe 44 to the main tank 16 because inflow into the tank is prevented by the float valve 66.

Having thus described my invention, I claim:

1. A continuous flow fuel system for an aircraft which comprises a first tank, a second tank and a third tank, a first fuel transfer means to withdraw fuel from the first tank and transfer it to a point of consumption, a second fuel transfer means to put the fuel in the second tank under pressure and to transfer it to the first tank, a third fuel transfer means to withdraw fuel from the third tank and to transfer it to the first tank, a float valve operative at a predetermined drop in fuel level in the first tank to open and receive the fuel from the second tank, and a second float valve operative at a further drop in fuel level in the first tank to open and receive the fuel from the third tank.

2. A continuous flow fuel system for an aircraft which comprises a main tank, an auxiliary tank and a drop tank, a first fuel transfer means to withdraw fuel from the main tank and transfer it to a point of consumption, a second fuel transfer means to put the drop tank fuel under pressure and to transfer it to the main tank, a third fuel transfer means to withdraw fuel from the auxiliary tank and transfer it to the main tank, a float valve, operative at a predetermined drop in fuel level in the main tank to open and receive the fuel from the drop tank, and a second float valve operative upon a drop in a lower fuel level in the main tank to open and receive the fuel from the auxiliary tank.

3. In a continuous fuel flow system for an aircraft, a main tank, an auxiliary tank and one or more drop tanks, a first fuel transfer means to withdraw fuel from the main tank and transfer it to a point of consumption, a second fuel transfer means to pressurize the drop tanks and transfer the fuel to the main tank, a third fuel transfer means to pump the fuel from the auxiliary tank to the main tank, a float valve, operative at a predetermined drop in fuel level in the main tank to receive the pressurized fuel from the drop tanks, and a second float valve operative upon a drop to a lower fuel level in the main tank to open and receive the fuel from the auxiliary tank.

4. In an aircraft fuel system, an engine pump, a main tank, an auxiliary tank, and one or more drop tanks, means to pressurize the drop tanks to force the fuel therefrom, means to pump the fuel from the main and auxiliary tanks, a selector cock having three inflow ports and one outflow port, a first passageway connecting the first inflow port to the main tank, a second passageway connecting the second inflow port to the auxiliary tank, a third passageway connecting the third inflow port to the drop tanks, a fourth passageway connecting the outflow port to the suction side of the engine pump, said selector cock having three positions, one for directing the fuel from the main tank directly to the engine pump by connecting the first and fourth passageways, a second, for directing the fuel in the auxiliary tank directly to the engine pump by connecting the second and fourth passageways, and a third for directing the fuel from the drop tanks directly to the engine pump by connecting the third and fourth passageways, conduit means including a float means between the drop tanks and the main tank operative when the fuel reaches a predetermined low level to receive the fuel from the drop tanks directly into the main tank, and a second conduit means including a float means between the auxiliary tank and the main tank operative when the fuel reaches a predetermined lower level to receive the fuel from the auxiliary tank directly into the main tank.

5. The device of claim 4, with valve means operative to open position by pressure at the discharge side of the main tank pumping means, whereby said fuel may not be transferred from the auxiliary tank to the main tank except when the main tank pumping means is in operation.

6. In a fuel system for an aircraft engine, an engine pump, a main fuel tank, an auxiliary fuel tank, an electric pump for each said tank, a power source for operating said electric pumps, a combined selector cock and selector switch, a first passageway connecting the discharge side of the main tank electric pump to the selector cock, a second passageway connecting the selector cock to the suction side of the engine pump, a third passageway connecting the discharge side of the auxiliary tank electric pump to the selector cock, a first electric conductor connecting the main tank electric pump to the selector switch, a second electric conductor connecting the selector switch to the power source, a third electric conductor connecting the auxiliary tank electric pump to the selector switch, said combined selector cock and switch having a first position for connecting the first and second passageways and the first and second conductors, and a second position for connecting the third and second passageways and the third and second conductors, a pipe connecting the discharge side of the auxiliary tank electric pump to the main tank, and a pressure openable valve in said pipe operative to be closed upon a failure of pressure at the discharge side of the main tank electric pump.

7. In an aircraft fuel system, an engine pump, a main tank, an auxiliary tank, one or more drop tanks all having inlet and outlet openings, a selector cock having an inflow and an outflow port, and off position, and a position for connecting the inflow to the outflow port, a passageway connecting the inflow port to the main tank outlet opening, a passageway connecting the outflow port to the suction side of the engine pump, conduit means connecting the outlet opening of the drop tanks to an inlet opening in the main tank, conduit means connecting the outlet opening of the auxiliary tank to an inlet opening in the main tank, pressure creating means for forcing fuel from the drop tanks through the first said conduit means, pressure creating means for forcing the fuel from said auxiliary tank through the second said conduit means, and means interposed in the first said conduit means to restrain the second pressure creating means from moving the fuel from the auxiliary tank until the first pressure creating means has moved the fuel from the drop tanks.

DAVID SAMIRAN.

(References on following page)

REFERENCES CITED

The following references are of record in the file of this patent:

UNITED STATES PATENTS

| Number | Name | Date |
|---|---|---|
| 1,329,997 | Page | Feb. 3, 1920 |
| 1,407,374 | Buckendale | Feb. 21, 1922 |
| 1,698,693 | Durdin | Jan. 8, 1929 |
| 1,744,684 | Griffith | Jan. 21, 1930 |
| 1,776,877 | Yonkese | Sept. 30, 1930 |
| 1,842,295 | Schurle | Jan. 19, 1932 |
| 2,146,729 | Gavin | Feb. 14, 1939 |
| 2,275,471 | Samiran | Mar. 10, 1942 |
| 2,334,220 | Samiran | Nov. 16, 1943 |
| 2,340,070 | McCauley et al. | Jan. 25, 1944 |
| 2,356,200 | Bedard | Aug. 22, 1944 |
| 2,356,786 | Harman et al. | Aug. 29, 1944 |
| 2,394,431 | Curtis et al. | Feb. 5, 1946 |
| 2,394,506 | Woods | Feb. 5, 1946 |
| 2,424,440 | Duffy | July 22, 1947 |